Sept. 12, 1967 F. E. SCOPPE 3,340,729
ELECTROMAGNETIC TORQUEMETER
Filed Jan. 27, 1965 2 Sheets-Sheet 1
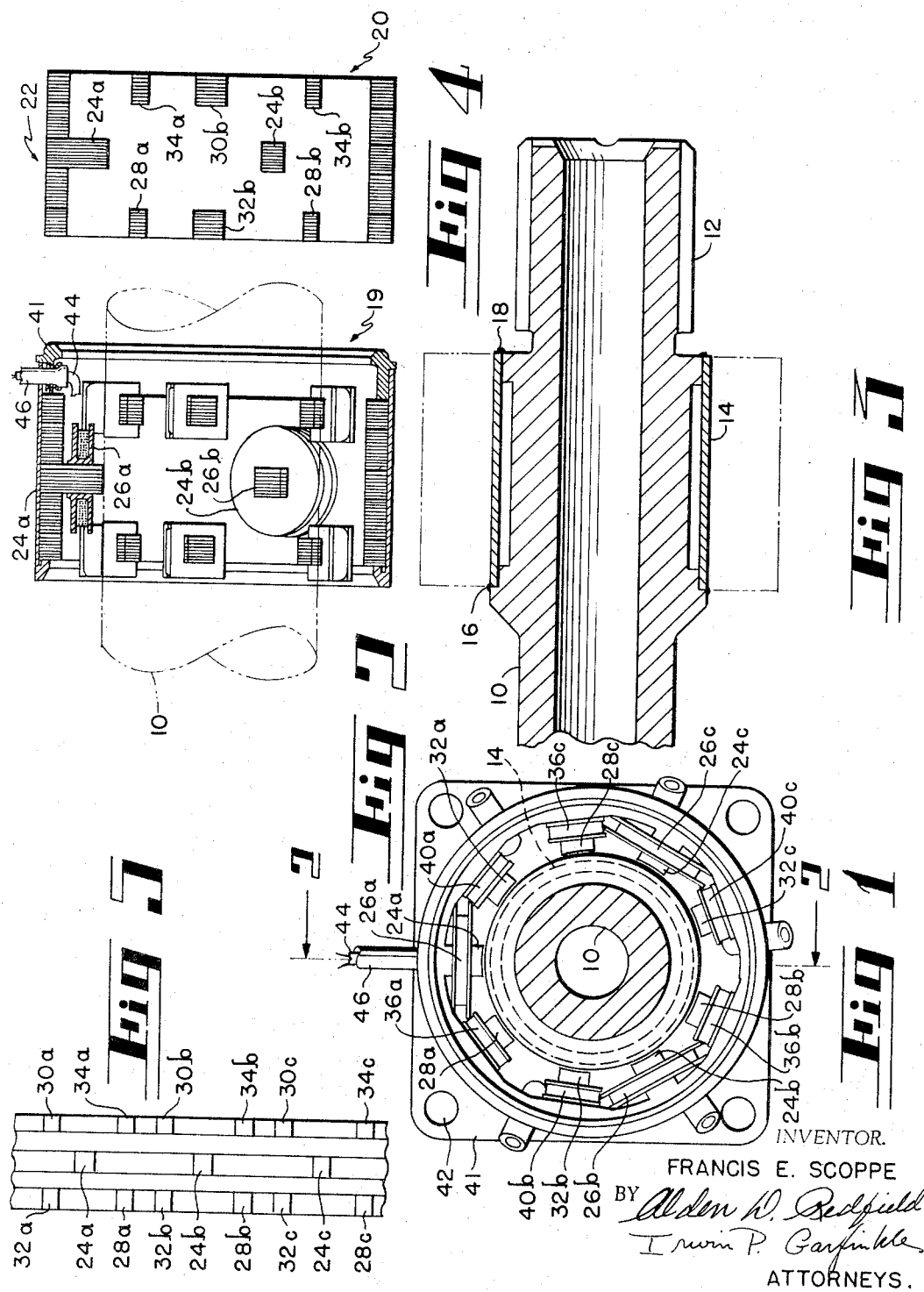
INVENTOR.
FRANCIS E. SCOPPE
BY
ATTORNEYS.

United States Patent Office 3,340,729
Patented Sept. 12, 1967

3,340,729
ELECTROMAGNETIC TORQUEMETER
Francis E. Scoppe, Monroe, Conn., assignor to Avco Corporation, Stratford, Conn., a corporation of Delaware
Filed Jan. 27, 1965, Ser. No. 428,323
7 Claims. (Cl. 73—136)

ABSTRACT OF THE DISCLOSURE

Torque in a nonmagnetic shaft is determined by measuring the change in current in the output of a transformer positioned around a magnetostrictive sleeve secured to the shaft. A static application of torque to the magnetostrictive sleeve, greater than the highest value expected to be measured, adjusts the permeability characteristics of the sleeve to increase sensitivity of the device.

The invention relates generally to apparatus for magnetically measuring the torsion in a rotating shaft, and more particularly to a torquemeter system using the principle that the magnetic reluctance of a metal is a function of the strain imposed on the metal.

When torsion is applied to a shaft, there is a resultant tension in the shaft at 45° to the longitudinal axis, and a resultant compression at 45° to this axis, but 90° to the tension. If the shaft is made of a magnetic material, the permeability in the shaft surface increases in the direction of compression strain but decreases in the direction of the tension strain. This invention measures torque as a function of the summation of such changes in permeability.

It is known that torsion can be measured in a magnetic shaft by encircling the shaft with two or more stationary magnetic cores having salient poles facing the shaft and being arranged side by side in the direction of the shaft, one of the cores being provided with an excitation of primary winding connected to an alternating current source and the other core or cores being provided with measuring or secondary windings connected to an electric measuring device. The secondary winding is physically positioned at an angle of 45° with respect to the primary winding, and thus of the magnetic shaft is not loaded, the magnetic fields between the different poles will be symmetrical so that zero equipotential lines are situated symmetrically under the secondary pole. However, when torque is applied to the shaft, the permeability of the shaft in the direction of tension is increased, while the permeability in the direction of compression is decreased, and the resulting fluxes cooperate in inducing an output voltage in the secondary windings. Such a prior art device is disclosed in a United States patent to Dahle No. 3,011,340.

The prior art, as demonstrated by the Dahle patent, has several limitations which this invention seeks to overcome. First, in many instances, for example in high-speed gas turbine engines, the optimum materials for the rotating shaft do not have the magnetic qualities needed to enable accurate measurement of the torque applied to the shaft. The present invention overcomes this limitation by affixing a magnetic sleeve to the load-carrying shaft so that a torsional strain proportional to the torsional load is imparted to the sleeve. The non-rotating core and coil portion of the measuring device now senses changes in permeability due to torsional strains in the rotating sleeve rather than in the rotating shaft. Therefore, a material can be selected for the shaft to optimize the properties required for the shaft, such as strength and hardness, but at the same time the sleeve may be selected for properties to optimize the change in reluctance with strain and to minimize temperature, hysteresis, and eddy current effects.

In general, this invention utilizes a stationary transformer with a primary winding for generating a constant magnetic flux. It also has two secondary windings: one oriented in the tension direction (45° to the axis of the shaft) and the other in the compression direction. The stationary transformer is so oriented that the surface of the rotating sleeve affixed to the shaft acts as part of the core of the transformer. Thus, the current induced in the two secondaries varies with the tension strain and compression strain caused by torque applied to the shaft. As the torque in the shaft increases, so do these strains, and the difference in the current induced in the secondaries of the transformer also increases.

Other major limitations of the prior art measuring device are its inherent non-linearity and its low calibration sensitivity. However, it has been found that the relationship between strain and magnetic reluctance, which is used to derive a torque measurement, may be altered so as to obtain improved performance in both of these regards. That is to say, static application of torque to the magnetostrictive sleeve, greater than the highest value to be measured, tends to permanently increase calibration sensitivity while permanently making the relationship between applied torque and the electrical output signal more linear. This change of calibration is reversible by application of torque opposite to the measuring direction.

Thus, this invention provides two improvements over the known prior art. First, the measuring device senses the change in permeability due to torsional strains in a magnetic sleeve rather than in the rotating shaft itself and, second, it applies a static torque to the sleeve to thereby increase calibration sensitivity and improve the linearity of the output signal. The static torque applied to the sleeve is generally in excess of any torque applied in normal use.

It is therefore an object of this invention to improve the operating characteristics of an induction-type torquemeter for determining torque applied to a shaft by measuring the torsional strain in a magnetic sleeve affixed to the shaft.

Another object of this invention is to improve the operating characteristics of a measuring device for measuring the torque applied to a shaft by measuring the change in torsional strain of a magnetic sleeve affixed to the shaft, a static torsional strain having been applied to the sleeve.

Still another object of this invention is to provide means for measuring torque applied to a rotating shaft, said means comprising a sleeve of magnetostrictive material affixed to the shaft, a stationary coil surrounding the sleeve, means for applying alternating current to the coil whereby a magnetic field is generated in said sleeve, and means for measuring the change in inductance in the sleeve due to torque applied to the shaft.

Still another object of this invention is to provide means for measuring torque applied to a rotating shaft, said means comprising a sleeve of magnetostrictive material affixed to the shaft, the sleeve having been subjected to a predetermined static torsional strain, a stationary coil surrounding the sleeve, means for applying alternating current to the coil whereby a magnetic field is generated in the sleeve, and means for measuring the change in inductance in the sleeve due to torque applied to the shaft.

For other objects and for a clearer understanding of this invention, reference should now be made to the following detailed specification and to the accompanying drawings in which:

FIGURE 1 is an end view of a preferred embodiment of this invention;

FIGURES 2, 3, and 4 are sections taken through the line 2—2 of FIGURE 1, FIGURE 2 showing the details of the cores, coils with the rotating shaft shown in outline, FIGURE 3 showing the details of the rotating shaft with the cores and coils shown in outline, and FIGURE 4 showing the details of the core;

FIGURE 5 is a plane projection of the poles of the core on the sleeve; and

Figure 6:
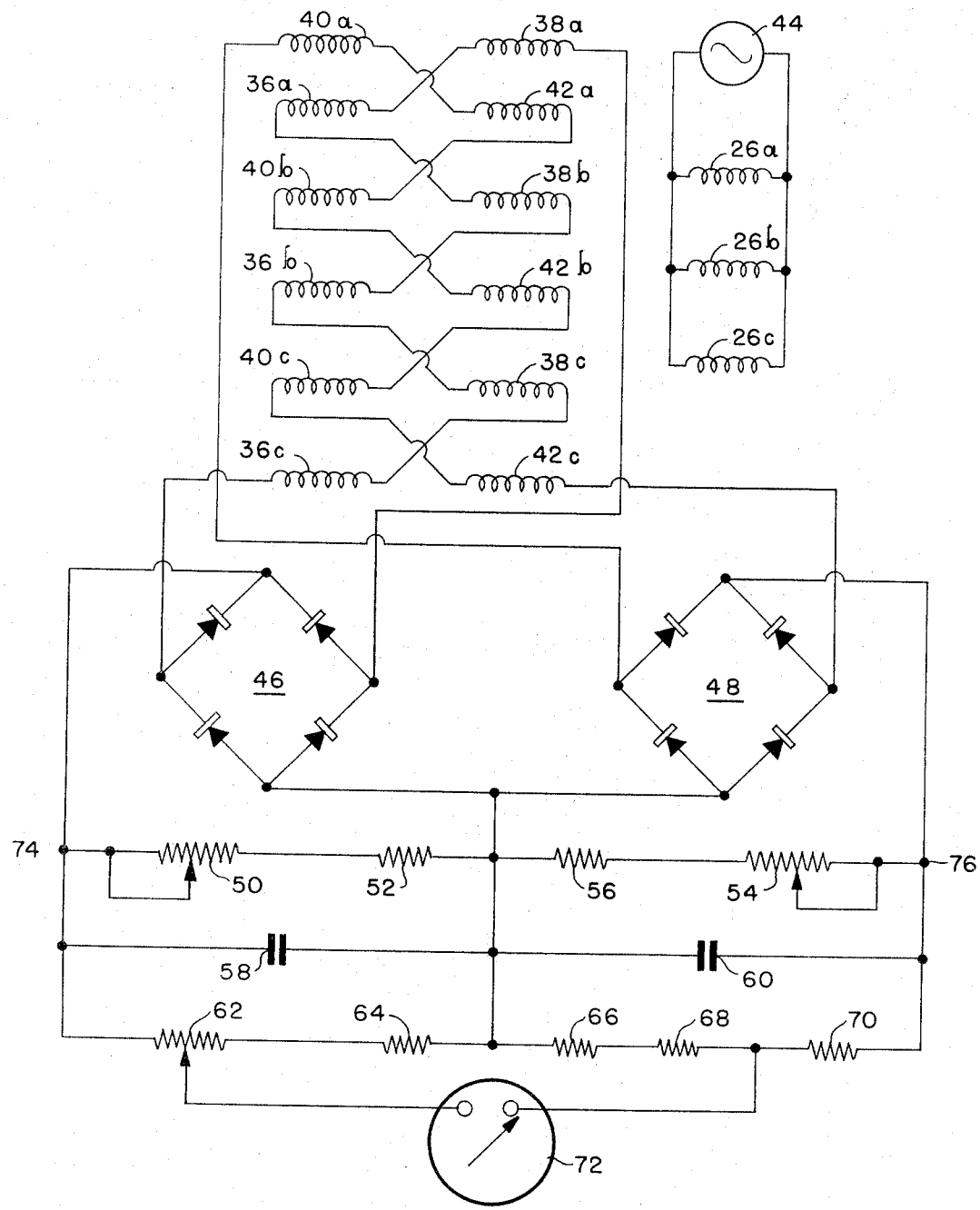
FIGURE 6 is an electrical schematic diagram showing the use of the invention.

Referring to FIGURES 1–4, the invention seeks to measure the torque applied to a rotating shaft 10 which may be keyed at 12 to a prime mover, such as a gas turbine, not illustrated. The shaft 10 may be constructed of any material, such as hardened steel, suitable for its particular application. It may or may not have magnetostrictive properties. However, this invention has particular utility in cases where the shaft 10 does not have the optimum magnetostrictive qualities for use in an inductive torque measuring device.

A sleeve 14 is welded, or otherwise rigidly attached, to the shaft 10 around its periphery at 16 and 18. While the weldments have been illustrated as raised portions on the shaft and sleeve, it will be understood that there are in fact no projections in the finished assembly. After the sleeve has been affixed, the shaft 10 and the sleeve 14 are stress relieved by first heating and then slowly cooling. The particular temperatures for this purpose are determined by the particular materials used. Thereafter, a static predetermined torsional strain is applied to the shaft 10 and sleeve 14 so that the magnetostrictive strain versus inductance characteristics of the sleeve 14 are altered. The static strain applied to the shaft and sleeve is generally in excess of any strain resulting from the application of torque to the shaft during normal operation.

The specific nature of the alteration resulting in the sleeve is not known at this time. The results, however, are observable, and it has been observed that the linearity of the torque versus reluctance curve is changed as a function of the degree of applied static torque.

The sleeve 14 is encircled by a transformer 19 including a laminated three-section magnetic core 20, each of the sections having a plurality of poles extending radially towards the sleeve 14 but spaced a short distance therefrom to provide a small air gap around the entire periphery of the sleeve 14. The magnetic core 20 is shown in FIGURE 4 with the pole spacings for each of the sections shown in projection in FIGURE 5.

The core 20 includes a primary section 22 having three poles 24a–c, each spaced 120° around the inner periphery of the core 20 and provided with primary windings 26a, 26b, and 26c, respectively.

The secondary portion of the core is provided with six pairs of poles. The poles in each of three of the pairs of poles 28a and 30a, 28b and 30b, and 28c and 30c are physically aligned with the poles 26a, 26b, and 26c, respectively, along a line which is at 45° with respect to the axis of the shaft 10, this line corresponding to the direction of tension resulting from applied torque to the shaft. The other three pairs of secondary poles 32a and 34a, 32b and 34b, and 32c and 34c are similarly aligned with the primary poles, but in the direction of compression. Each of the poles 28a–c and 30a–c is provided with a winding 36a–c and 38a–c, respectively, arranged in corresponding pairs, while each of the poles 32a–c and 34a–c are similarly provided with windings 40a–c and 42a–c. Thus, pairs of the windings 36a–c and 38a–c are aligned with a respective primary winding 26a–c in the direction of tension while pairs of the windings 40a–c and 42a–c are similarly aligned in the direction of compression. As will be seen in FIGURE 6, the windings 40a, 42a, 42b, 42b, 40c, and 42c are connected in series while the windings 36a, 38a, 36b, 38b, 36c, and 38c are similarly connected in series. The physical arrangement of the pairs of windings means that each pair of windings will be influenced only by the compression strain or the tension strain and that any non-homogeneities in the sleeve 14 will be averaged out by the series connections of the pairs.

The entire core is potted with a suitable plastic, not shown, and is fixedly mounted in a support 41 provided with holes 42 for mounting the assembly in stationary relationship with respect to the rotating shaft. Electrical wires 44 from the coils extend through a sleeve 46 to control circuitry and an indicator digrammatically illustrated in FIGURE 6.

Referring to FIGURE 6, the primary windings 26a–c are connected in parallel across an alternating current source 44, and the current flowing through these windings serves to generate a constant magnetic flux in the sleeve 14. The alternating currents generated in the series-connected secondary windings 36a–c and 38a–c are converted to a direct current by means of a full-wave rectifier 46 while the currents generated in the secondary windings 40a–c and 42a–c are converted to a direct current by full-wave rectifier 48. The resistors 50 and 52 are connected across the output of rectifier 46, while resistors 54 and 56 are connected across the output of rectifier 48, the resistors 50 and 54 being adjustable to provide zero output from the rectifiers in the absence of applied torque to the shaft and for adjusting the slope of the torque versus output current curve so as to correspond with indicator calibrations. Capacitors 58 and 60 in parallel with resistors 62, 64, 66, 68, and 70 provide the input to the indicator 72, the resistor 62 having an adjustable tap for making any necessary zero adjustment on the indicator 72.

Calibrating the system requires that the current developed through the indicator 72 conforms to a standardized relation between torque and current. This is necessary to provide free interchange without system recalibration of the indicator 72. The standardization of the torque versus current calibration is accomplished by adjusting for zero meter indication with no torque on the shaft by changing potentiometer 50 to provide more resistance between junction 74 and resistor 52, simultaneously changing resistor 54 an equal amount to provide less resistance between junction 76 and resistor 56, or vice versa. The slope of the torque versus current relationship is changed by simultaneously adjusting potentiometers 50 and 54 an equal amount to provide more or less resistance. The linearity of the torque-current relationship is altered by applying torque to the shaft 12 with the sleeve 14 attached. Application of torque in the direction to be measured but in excess of the highest torque to be measured will make the torque-current relationship more linear. Torque application in the opposite direction but also in excess of the highest torque to be measured will make the torque-current relationship more non-linear.

Thus there has been described a magnetic torquemeter which measures the torque in a magnetic sleeve affixed to the shaft rather than in the shaft itself. The non-rotating coil portions of the torquemeter sense changes in permeability due to torsional strains in the rotating sleeve, permitting selection of a shaft with the optimum properties required for strength and hardness. At the same time the properties of the magnetic sleeve are chosen so as to optimize the change in reluctance with strain and to minimize temperature, hysteresis, and eddy current effects. The only limitation on the selection of materials for the sleeve is that the coefficient of thermal expansion of the sleeve must be the same as that of the shaft material.

Furthermore, the fact that the relationship between strain and magnetic reluctance can be altered has been utilized by statically applying a torque to the sleeve in an amount in excess of the highest torque to be applied under normal use. The static application of a torque produces a residual strain in the sleeve resulting in a more linear relationship between the torque applied to the shaft and the electrical output signal. The magnitude of the over-torque can be empirically determined, and its effect does not change with time or with temperature (measured to 600° F.). The over-torque may be applied to the sleeve in either direction.

In addition, by using six pairs of secondary windings, three pairs arranged for sensing tension components and three pairs arranged for sensing compression components, irregularities in the air gap are averaged out, and a very linear device has been achieved.

The referenced Dahle Patent 3,011,340 suggests a relationship between torsional stress and magnetic effects. This relationship holds true, however, only at constant temperatures. More correctly, a relationship exists between torsional strain and magnetic effects. Torsional stress divided by torsional strain is equal to modulus of rigidity, but modulus of rigidity is a constant only when the temperature is a constant. It is known that torque is proportional to torsional stress and also is proportional to torsional strain times the modulus of rigidity. Since the modulus of rigidity changes with temperature, means must be provided for compensating for the change in the modulus of rigidity. Two methods are available.

It is known that the average air gap between the magnetic cores and the sleeve controls the sensitivity of the torque versus signal calibration. Therefore, by making the sleeve and shaft of materials whose coefficient of expansion is larger than the coefficient of expansion of the core laminations, the average air gap will decrease with temperature. By proper selection of the diameter of the shaft and sleeve and the nominal air gap, compensation for the decrease of modulus of rigidity with temperature is achieved. While the compensation is not exact because the modulus of rigidity change with temperature is roughly linear, while the changes in air gap follow the inverse square law, practical experience in the selection of materials has resulted in compensations resulting in deviations of less than 1% over a temperature range of 250° F. These results were achieved in a torquemeter reduced to practice with laminations of 50% nickel, 50% iron (coefficient of expansion $3.2 \times 10^{-6}$ per degree F.), a 2½% silicon steel sleeve (coefficient of expansion $6.4 \times 10^{-6}$ per degree F.), a shaft diameter of 1.8 inches, and a nominal air gap of .014 inch.

Another method of compensation is to increase the amplitude of the alternating current source with temperature to compensate for the reduction in modulus of rigidity with temperature and, thus, maintain a constant output signal for a constant torque with variations in temperature. This was accomplished in actual practice by sensing temperature with an element whose electrical resistance changed with temperature and including this resistive element in the feedback path of the alternating current supply.

Various adaptations and modifications will be readily apparent to persons skilled in the art. For example, the over-torqued magnetic sleeve may be used in conjunction with cores of other configurations. It is intended, therefore, that the scope of the invention be limited only by the appended claims as interpreted in the light of the prior art.

What is claimed is:
1. Means for measuring the torque applied to a rotating shaft, the combination comprising:
   a magnetic sleeve on said shaft, at least the ends of said sleeve being affixed thereto, the permeability of said sleeve changing as a function of torsional strain due to the torque being measured, a predetermined static torque being applied to said shaft and said sleeve, the residual strain in said sleeve due to said static torque altering the permeability characteristic of said sleeve;
   a primary winding positioned adjacent said sleeve;
   a second winding positioned adjacent said sleeve, but physically spaced from said primary winding at an angle of 45° with respect to the axis of said shaft, said primary and secondary windings being stationary with respect to said rotating shaft;
   a source of alternating currents energizing said primary winding for generating flux through said sleeve; and
   current measuring means connected across said secondary winding, said current being a function of the permeability of said sleeve.

2. The invention as defined in claim 1 wherein said static torque is in excess of the normal maximum torque to be measured.

3. Means for measuring the torque applied to a rotating shaft, the combination comprising:
   a magnetic sleeve on said shaft, at least the ends of said sleeve being affixed thereto, the permeability of said sleeve changing as a function of torsional strain due to the torque being measured, a predetermined static torque being applied to said shaft and said sleeve, the residual strain in said sleeve due to said static torque altering the permeability characteristic of said sleeve;
   a primary winding positioned adjacent said sleeve;
   a secondary winding positioned adjacent said sleeve, but physically spaced from said primary winding at an angle of 45° with respect to the axis of said shaft, said primary and secondary windings being stationary with respect to said rotating shaft, said secondary winding comprising at least first and second pairs of secondary coils, the windings of each pair being axially spaced, said primary winding being intermediate thereof, said first pair of secondary coils and said primary winding being aligned at 45° with respect to said axis, said second pair of coils and said primary winding being aligned at 90° with respect to the alignment of said first pair of coils, said primary winding comprising a plurality of primary coils spaced around the periphery of said sleeve, and a first and second pair of said secondary coils for each of said primary coils, said first pairs of secondary coils being connected in series, and said second pairs of secondary coils being connected in series;
   a source of alternating currents energizing said primary winding for generating flux through said sleeve; and
   current measuring means connected across said secondary winding, said current being a function of the permeability of said sleeve.

4. The invention as defined in claim 3 wherein said static torque is in excess of the normal maximum torque to be measured.

5. The invention as defined in claim 4, and an arcuate magnetic core encircling said sleeve, said core having a plurality of radial poles projecting towards but spaced from said sleeve, said coils being positioned on respective ones of said poles.

6. Means for measuring the torque applied to a rotating shaft, the combination comprising:
   a magnetic sleeve affixed to said shaft, a predetermined static torque being applied to said shaft and said sleeve, the residual strain in said sleeve due to said static torque altering the permeability characteristic of said sleeve;
   a transformer having a primary winding and a secondary winding;
   a source of alternating currents energizing said primary winding, said sleeve constituting a flux path between said primary and secondary windings; and
   means for measuring the currents generated in said secondary winding, said currents being a function of the permeability of said sleeve, the permeability of said sleeve varying with applied torque and being a function thereof.

7. The invention as defined in claim 6 wherein said static torque is in excess of the normal maximum torque to be measured.

References Cited

UNITED STATES PATENTS 2,553,833   5/1951   Rifenbergh ---------- 73—136
3,011,340   12/1961  Dahle --------------- 73—136

OTHER REFERENCES

Beth et al.: "Magnetic Measurement of Torque in a Rotating Shaft," Review Scientific Instruments, vol. 25, No. 6, June 1954, pp. 603–607.

JAMES J. GILL, *Acting Primary Examiner.*

RICHARD C. QUEISSER, *Examiner.*

C. A. RUEHL, *Assistant Examiner.*